INVENTOR.
Thomas O. Kosatka.

INVENTOR.
Thomas O. Kosatka

Feb. 20, 1962 T. O. KOSATKA 3,022,081
SELF-CONTAINED FLUID SEAL
Filed Aug. 1, 1957 3 Sheets-Sheet 3

INVENTOR.
Thomas O. Kosatka,
BY George H. Simmons
atty

United States Patent Office 3,022,081
Patented Feb. 20, 1962

3,022,081
SELF-CONTAINED FLUID SEAL
Thomas O. Kosatka, Chicago, Ill., assignor to Victor Manufacturing & Gasket Co., Chicago, Ill., a corporation of Illinois
Filed Aug. 1, 1957, Ser. No. 675,691
5 Claims. (Cl. 277—39)

This invention relates to self-contained fluid seals and has for its principal object the provision of a new and improved device of this kind.

It is a main object of the invention to provide a device for forming a fluid tight seal between two relatively rotatable machine parts, which device has two portions each of which is fixed in seal forming engagement with one of the machine parts, which portions are relatively rotatable and one of which portions carries a sealing lip maintained in seal forming engagement with the other portion.

Another object of the invention is to provide a sealing device having an outer metallic shell dimensioned for press fit in a bore in the outer one of two relatively rotatable members and having an inner metallic shell partially coated with an elastomer by which seal is formed with the inner one of the relatively rotatable members and in which the inner shell carries also a sealing lip that is pressed into seal forming engagement with the outer shell by a garter spring and in which the inner shell also carries auxiliary seal rings that engage the outer shell to form a seal therewith.

Another object of the invention is to provide in a sealing device as set out in the preceding object, a liner in the outer shell that is separate therefrom and may be composed of material different than the material of which the outer shell is composed, which liner is fixed in the outer shell and is engaged by the sealing lip on the inner shell.

Further objects of the invention not specifically mentioned here will be apparent from the detailed description and claims which follow, reference being had to the accompanying drawings in which a preferred embodiment of the invention is shown by way of example and in which:

Figure 1:
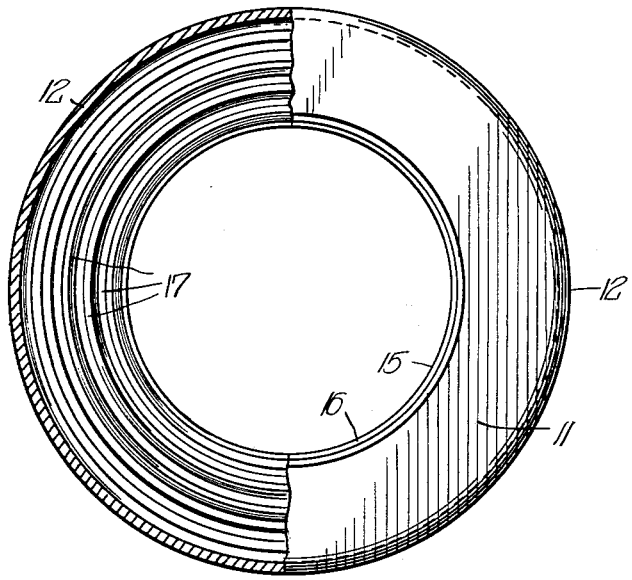
FIG. 1 is a plan view of the seal with a part of the outer end wall of the shell broken away.
Figure 2:
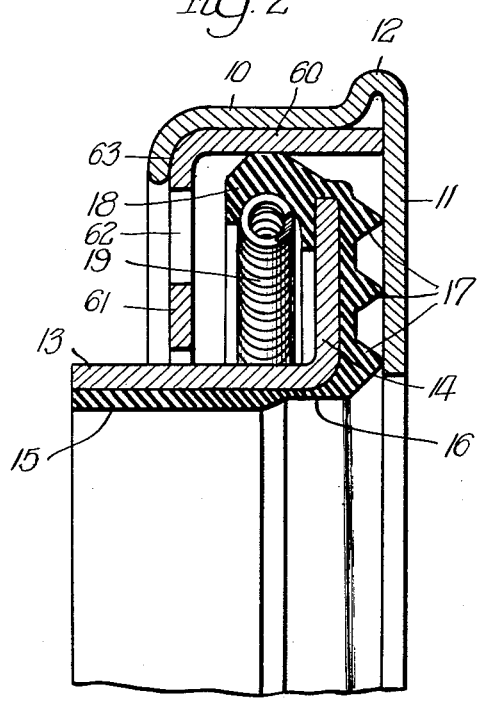
FIG. 2 is a cross sectional view through the seal shown in FIG. 1, drawn to an enlarged scale.

Referring now to the drawings in more detail, particularly FIGS. 1 and 2, it will be seen that the seal of the present invention consists of an outer metallic shell having an outer cylindrical wall 10 connected at one of its ends to a radial wall 11 through an outwardly extending bead 12 that facilitates removal of the shell from a machine part in which it is installed. The outer surface of the outer cylindrical wall 10 of this shell is ground to accurate dimension for press fit into the bore in the outer of two relatively movable machine parts with which the seal is adapted to function.

The device also consists of an inner metallic shell having a cylindrical portion 13 from one end of which a radial portion 14 extends outwardly. Bonded to the inner surface of the cylindrical portion 13 is a tube of elastomer 15 having a lead-in ring 16 formed in its inner surface adjacent one end of the shell. The internal diameter of the lead-in ring 16 is shown to be slightly larger than the diameter of the machine part with which the device is adapted to function, and the remainder of the tube 15 is shown to have a smaller inside diameter that is slightly less than the diameter of the machine part. As shown, the radial thickness of the tube 15 is slightly less than the radial thickness of the portion 13 of the inner shell. The elastomer extends up alongside of and is bonded to the outer surface of the wall 14, this portion thereof containing a plurality of auxiliary sealing lips 17.

Extending outwardly and axially from the outer end of the wall 14 is a sealing lip 18, the inner surface of which contains a groove in which an expansion type garter spring 19 is positioned.

Figure 3:
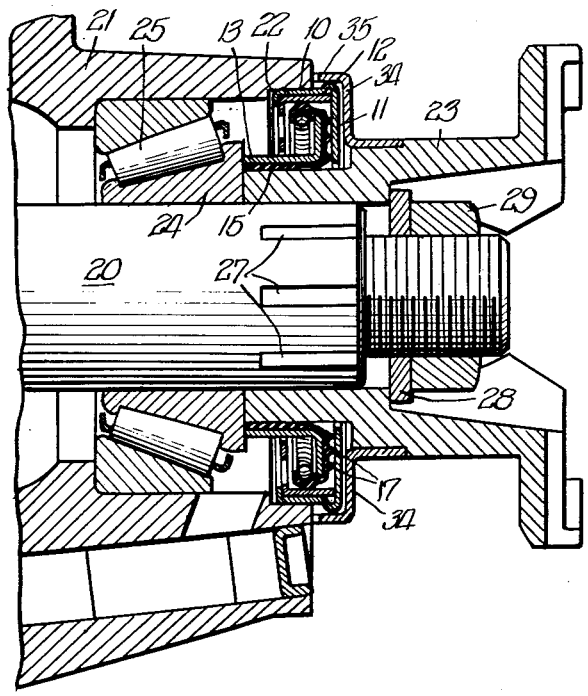
FIG. 3 is a cross sectional view showing a typical installation of the seal shown in FIGS. 1 and 2.

As will be seen in FIG. 3, a seal of this type may be used to seal the drive shaft 20 of a differential unit, which shaft projects out of the housing 21 of the unit. The outer shell 10 forms a press fit with a bore 22 in the differential housing and the inner elastomer wall 15 forms a seal with the hub of the driving flange 23.

It will be noted that with the seal in this operating position, the outer end of the inner cylindrical wall 13 abuts against the cone 24 of the roller bearing 25 by which the shaft 20 is supported in the differential housing 21. Through this abutment of the inner cylindrical shell with the bearing cone, the inner and outer portions of the sealing device are positioned in proper operating position relative to each other, with the auxiliary seals 17 pressed against the radial wall 11 of the outer shell to form a seal therewith.

Figure 4:
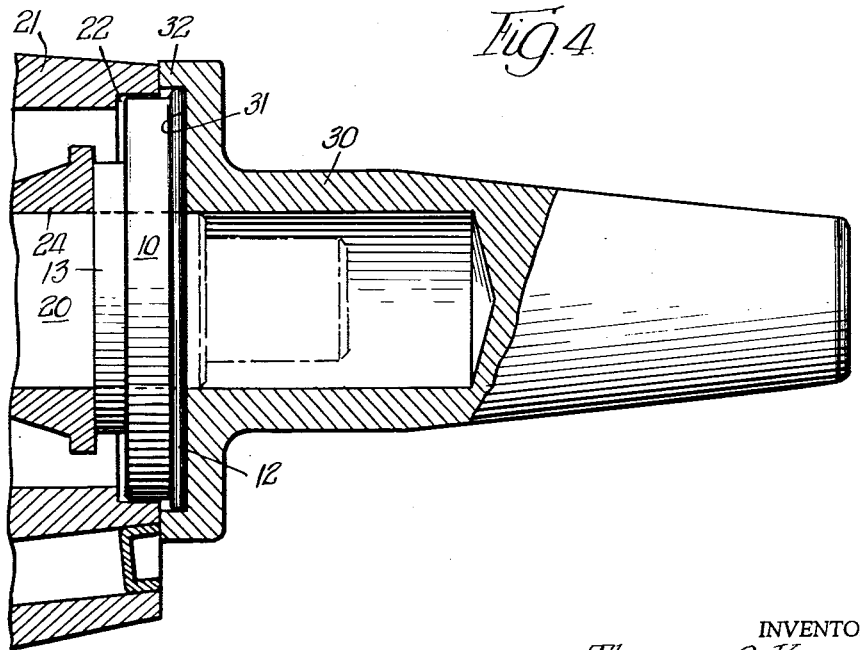
FIG. 4 is a view partly in section, showing the method of installing the seal as shown in FIG. 3.

As will be noted in FIG. 3, the outer cylindrical wall 10 of the outer shell is not forced into the bore 22 completely, but rather is spaced slightly from the bottom of that bore. In FIG. 4, there is shown a typical tool by which the parts are accurately positioned in this operative position. After the bearing 25 and shaft 20 have been put in the housing, the sealing device is registered with a tool 30 which in its end portion has a socket 31 in which the outer shell of the sealing device accurately fits. A flange 32 on the tool overlaps the outer shell so that as the tool is struck with a hammer to drive the sealing device into the bore 22, this flange is driven into engagement with the outer end of the differential housing 21, thereby to limit the movement of the sealing device inwardly in the bore. When this engagement is established, the end of the inner cylindrical wall 13 of the sealing device abuts against the cone 24 and the sealing device is therefore positioned in proper position, as shown in FIG. 3.

After the sealing device is thus installed, the drive flange 23 is registered with the shaft and brought into engagement with the lead-in ring 16 in the inner elastomer wall, which engagement serves to center the inner member of the sealing device in proper relation to the shaft 20 since the outer surface of the drive flange is concentric with respect to the shaft. The drive flange is then forced inwardly with its splines registered with the splines 27 in the shaft, until the inner end of the drive flange abuts against the bearing cone 24. This compresses the elastomer in wall 15 against the inner surface of the cylindrical wall 13 to fix the inner portion of the sealing device in seal forming engagement with respect to the drive flange. The assembly is completed by registering a sealing member washer 28 with the shaft and applying a nut 29 on the threaded portion thereof to lock the drive flange with respect to the shaft. In most instances, the drive flange will carry a splash shield 34 which has an outer flange portion 35 that overhangs the bead 12 on the outer shell of the sealing device. This splash shield guards against the entry of foreign material into the seal.

With the seal so positioned, as the shaft 20 is rotated, the inner portion of the seal rotates therewith and escape of lubricant through the bearing 25 is prevented by the seal forming engagement of the sealing lip 18 with the stationary member engaged thereby. Engagement of the auxiliary seal 17 with the radial wall 11 prevents the entry of dust, dirt and water into the seal.

With the sealing device just described, it is not necessary that the manufacturer of the drive flange 23 finish the surface engaged by the seal to a high degree of smoothness, as would be necessary if the sealing lip of an ordinary type of oil seal was in engagement with that surface to form a fluid tight seal therewith. Thus through this arrangement the manufacturer of the sealing device can prepare a surface against which the sealing lip forms a seal in whatever manner is best suited to the particular material of which the sealing lip is composed. The seal manufacturer manufactures the entire seal and does not depend upon the machine manufacturer to prepare one of the sealing surfaces involved. It frequently happens that in installations in which seal between a driven flange, such as 23, and a differential housing, such as 21, has been formed by a sealing device in which the sealing lip bears upon the cylindrical portion of the drive flange, a groove will be worn in this portion, and upon failure of the seal the drive flange must be replaced in order to permit the re-forming of a fluid tight seal. With the device of the present invention, replacement of the drive flange is not necessary, as the grooves which have been formed in the cylindrical surface of that flange do not prevent the forming of a fluid tight seal by the elastomer wall 15 and the seal of the present invention, therefore, has additional use as a replacement seal which renders unnecessary replacement of any of the machine parts.

Figure 5:
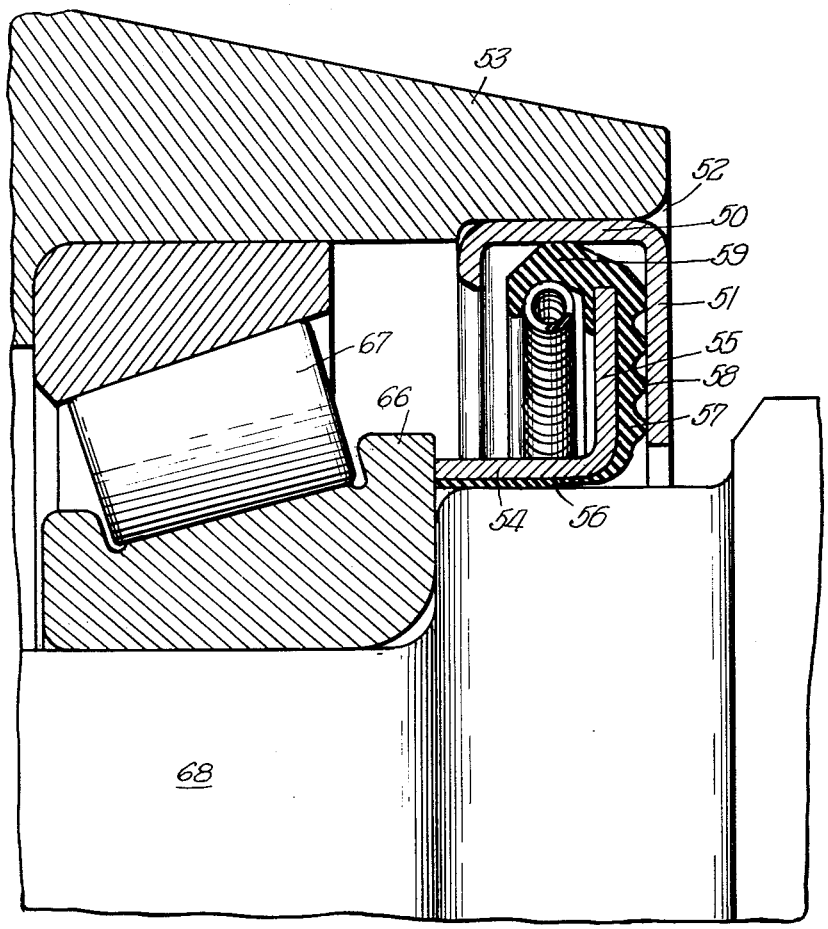
FIG. 5 is a fragmentary cross sectional view showing a typical installation of a modified form of the sealing device.

In FIG. 5, I have shown a slightly modified form of sealing device, incorporating the teachings of the present invention, the device being installed to form a seal between a stationary axle and the hub of a wheel mounted upon that axle. The sealing device thus shown consists of an outer shell 50, the outer cylindrical portion of which is joined directly to the radial wall 51; that is to say, the outwardly extending bead is omitted, and the sealing device is adapted to be mounted in a bore 52 in a hub 53, with the outer wall 51 flush with the end of the hub.

The inner shell of the seal has a cylindrical portion 54, a radial portion 55 as before, with an elastomer tube 56 bonded to the inner surface of the cylindrical portion 54, and with a radial wall of elastomer 57 bonded to the radial wall 55. Auxiliary sealing lips 58 are provided as before. The main sealing lip 59 is forced against the inner surface of the wall 50 of the shell by an expansion type garter spring as before.

With the seal installed in the hub 53 of the wheel, with the outer surface of wall 51 flush with the end of the hub, the inner end of the inner cylindrical wall of the inner shell abuts against the cone 66 of the bearing 67, thereby to position the sealing lip 59 in proper working position in the outer shell and to compress the apexes of the auxiliary seals 58 against the inner surface of the radial wall 51 of the outer shell. Through this arrangement, the inner portion of the seal is fixed upon the shaft 68 which is stationary and therefore the sealing lip remains stationary, and the outer shell which is fixed in the hub is rotated with respect to the sealing lip, this arrangement being the reverse of the arrangement shown in FIG. 3.

In FIG. 5, the sealing lip 59 is shown engaged with the inner surface of the outer wall 50 of the shell to form a seal therewith. In FIG. 2, a different arrangement is shown. The lip 18 bears against an inner cylindrical liner 60 that fits within the outer shell wall 10 and abuts against the inner surface of the radial wall 11 of the shell. A radial flange 61 projects inwardly from the outer end of liner 60. Flange 61 contains a plurality of perforations 62 through which the lubricants to be sealed may pass in and out of the sealing device. The end of outer wall 10 is rolled over the free end of liner 60, as indicated at 63, to hold that member fixed in the shell.

The liner may be composed of the same material as the shell or it may be made from different material and hardened and polished if composed of a material that can be hardened. It may also be composed of a non-metallic material such as, for example, a thermosetting resin. Thus through the use of the liner, the sealing lip forms a seal with a material best suited to cope with conditions encountered. The liner may be used in either of the two embodiments of the invention shown.

From the foregoing, it will be apparent that I have provided a self-contained sealing device in which all of the sealing surfaces and instrumentalities are contained, so that the machine manufacturer using the sealing device is not called upon to especially prepare any sealing surfaces. Tool marks and the like, which ordinarily appear in machine parts, are not detrimental to the forming of a fluid tight seal, and as a replacement item the device of the present invention permits re-sealing under conditions where a sealing surface has been damaged.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What I claim is:

1. A device for sealing the space between two relatively rotatable members, comprising: an outer metallic shell member having an outer cylindrical wall dimensioned for press fit in a bore in the outer member and having a radial wall extending inwardly from one end of said cylindrical wall; an inner metallic shell member having a cylindrical wall dimensioned to fit loosely over the inner one of the members between which the device is designed to form a seal, and having a radial wall extending outwardly from one end of the cylindrical wall; said inner and outer members being fitted together with said radial walls adjacent each other; an elastomer member bonded to said inner shell member and including a sealing lip engaged with an inner surface on the outer cylindrical member, a radial portion including concentrically disposed auxiliary sealing lips engaging the inner surface of the radial wall of the outer shell member, and a tube disposed on the inner cylindrical surface of the inner shell member and having an internal diameter less than the outside diameter of the inner one of the members between which the device is designed to form a seal; and an expansion type garter spring disposed in a groove in said sealing lip for maintaining the lip in seal forming engagement with the outer shell.

2. A device as specified in claim 1, in which the sealing lip extends outwardly and axially from the outer edge of the radial wall of the inner shell member and in which the radial portion of the elastomer is integral with the other portions thereof and is disposed on and bonded to the face of said radial wall that is adjacent to the radial wall of the outer shell member.

3. A device as specified in claim 1, in which the elastomer tube has radial thickness less than the radial thickness of the cylindrical wall of the inner shell member.

4. A device as specified in claim 3, in which the elastomer tube contains a lead-in ring having inside diameter larger than the inside diameter of the remainder of the tube.

5. A device as specified in claim 1, in which a liner is fixed in the outer shell and includes an integral radial wall spaced from the radial walls of the inner and outer shells and extending inwardly towards the cylindrical portion of the inner shell, which liner wall contains perforations through which the fluid being sealed may pass.

References Cited in the file of this patent

UNITED STATES PATENTS

| | | |
|---|---|---|
| 2,210,723 | Kosatka | Aug. 6, 1940 |
| 2,240,252 | Bernstein | Apr. 29, 1941 |
| 2,388,925 | Messinger | Nov. 13, 1945 |
| 2,415,888 | Joy | Feb. 18, 1947 |
| 2,651,534 | Kosatka | Sept. 8, 1953 |
| 2,744,772 | Amirault | May 8, 1956 |

FOREIGN PATENTS

| | | |
|---|---|---|
| 479,743 | Great Britain | Feb. 10, 1938 |
| 854,448 | Germany | Nov. 4, 1952 |